(12) United States Patent
Zhang

(10) Patent No.: US 12,501,885 B1
(45) Date of Patent: Dec. 23, 2025

(54) EGG INCUBATOR WITH A PRECISION ADJUSTMENT FUNCTION OF HUMIDITY

(71) Applicant: Chunfeng Zhang, Guangdong (CN)

(72) Inventor: Chunfeng Zhang, Guangdong (CN)

( * ) Notice: Subject to any disclaimer, the term of this patent is extended or adjusted under 35 U.S.C. 154(b) by 0 days.

(21) Appl. No.: 19/184,233

(22) Filed: Apr. 21, 2025

(30) Foreign Application Priority Data

Nov. 11, 2024 (CN) .......................... 202422742804.0
Mar. 28, 2025 (CN) .......................... 202520575454.5

(51) Int. Cl.
*A01K 41/04* (2006.01)
*A01K 41/02* (2006.01)
*A01K 41/06* (2006.01)

(52) U.S. Cl.
CPC ............ *A01K 41/04* (2013.01); *A01K 41/023* (2013.01); *A01K 41/06* (2013.01)

(58) Field of Classification Search
CPC ....... A01K 41/04; A01K 41/00; A01K 41/023
See application file for complete search history.

(56) References Cited

U.S. PATENT DOCUMENTS

| 12,029,202 B1* | 7/2024 | Wang | A01K 41/04 |
| 2024/0138378 A1* | 5/2024 | Meng | A01K 41/06 |
| 2024/0196870 A1* | 6/2024 | Wang | A01K 41/06 |

FOREIGN PATENT DOCUMENTS

KR 1880501 B1 * 7/2018

* cited by examiner

*Primary Examiner* — Kristen C Hayes
(74) *Attorney, Agent, or Firm* — Scully, Scott, Murphy & Presser, P.C.

(57) ABSTRACT

An egg incubator with a precision adjustment function of humidity includes a hood, a rotation frame, and a host portion. The hood is provided with an incubation compartment. The rotation frame is arranged in the hood, and includes a housing, a fan, an exhaust valve, a humidity sensor, and a main control circuit board. The housing is provided with a work compartment, a circulation air inlet, a circulation air outlet, and a valve opening. The housing is provided with a humidification tank. egg incubator is provided with an internal circulation air path and an external circulation air path. When the air humidity is less than a first preset humidity threshold, the main control circuit board controls the exhaust valve to close the valve opening; when the air humidity is greater than a second preset humidity threshold, the main control circuit board controls the exhaust valve to open the valve opening.

20 Claims, 10 Drawing Sheets

EGG INCUBATOR WITH A PRECISION ADJUSTMENT FUNCTION OF HUMIDITY

CROSS-REFERENCE TO RELATED APPLICATIONS

The present disclosure claims priority to and the benefit of Chinese Application Patent Serial No. 202422742804.0, filed with the Chinese Patent Office on Nov. 11, 2024, and Chinese Application Patent Serial No. 202520575454.5, filed with the Chinese Patent Office on Mar. 28, 2025. The disclosures of the aforementioned disclosures are hereby incorporated by reference in their entireties.

TECHNICAL FIELD

The present disclosure relates to the technical field of egg hatching, and in particular to an egg incubator with a precision adjustment function of humidity.

BACKGROUND

At present, although an existing egg incubator also has a humidity adjustment function, due to the influence of factors such as poor structural design, it is unable to effectively control humidity. There are problems such as uneven internal humidity, too large or too small humidity, and unstable humidity. Therefore, the development of an egg incubator with a precision adjustment function of humidity has become an urgent problem to be solved by those skilled in the art.

SUMMARY

The present disclosure is designed to solve the above deficiencies, and provides an egg incubator with a precision adjustment function of humidity.

The present disclosure provides an egg incubator with a precision adjustment function of humidity. The egg incubator with a precision adjustment function of humidity includes a hood, a rotation frame, and a host portion. The hood is provided with an incubation compartment. The hood is provided with an incubation compartment and a mounting opening in air communication with the incubation compartment. The rotation frame is arranged in the incubation compartment and configured to carry an incubated egg. The host portion, arranged at the mounting opening. The host portion includes a housing, a fan, an exhaust valve, a humidity sensor, and a main control circuit board. The main control circuit board is electrically connected to the fan, the exhaust valve, and the humidity sensor. The housing is provided with a work compartment, a circulation air inlet, a circulation air outlet, and a valve opening. The circulation air inlet and the circulation air outlet are in air communication with the work compartment and the incubation compartment. The valve opening is in air communication with the work compartment and outside air. The fan is arranged in the work compartment. The exhaust valve is arranged at the housing and is configured to open or close the valve opening. The housing is provided with a humidification tank in a path of airflow providing by the fan, and the humidity sensor is configured to detect air humidity in the incubation compartment. The incubation compartment, the circulation air inlet, the work compartment, and the circulation air outlet are sequentially in air communication to form an internal circulation air path, and the incubation compartment, the circulation air inlet, the work compartment, and the valve opening are sequentially in air communication to form an external circulation air path. When the air humidity in the incubation compartment detected by the humidity sensor is less than a first preset humidity threshold, the main control circuit board controls the exhaust valve to close the valve opening, and the airflow providing by the fan is in contact with humidification liquid stored in the humidification tank and circulates between the work compartment and the incubation compartment by the internal circulation air path. When the air humidity in the incubation compartment detected by the humidity sensor is greater than a second preset humidity threshold, the main control circuit board controls the exhaust valve to open the valve opening, and the airflow providing by the fan is discharged to the outside air by the external circulation air path.

The egg incubator with the precision adjustment function of humidity is provided by the present disclosure. On a first aspect, according to the setting of humidity sensor that monitors the air humidity in the incubation compartment of the egg incubator, the air humidity in the incubation compartment may be accurately adjusted, which ensures the stability of the air humidity of incubation environments, improves the air quality of the incubation compartment in the incubation compartment, improves the effect of hatching eggs, as well as to realizes the automated control of the air humidity in the incubation compartment of the egg incubator to save the cost of manpower. On a second aspect, the egg incubator may realize a humidifying function or a dehumidifying function by setting different airflow paths under the humidification work and the dehumidification work, which realizes even distribution of moisture, avoids local over-humidification or over-drying, improves humidifying and dehumidifying effect, and reduces energy consumption. On a third aspect, the egg incubator adopts the same fan to realize humidification or dehumidification work, which simplifies operation, saves cost, reduces components, improves the integration degree of host portion, and realizes the miniaturized design of the egg incubator.

BRIEF DESCRIPTION OF THE DRAWINGS

In order to describe the technical solutions in the present disclosure more clearly, the accompanying drawings required to be used in the implementations will be simply introduced below. It is apparent that the accompanying drawings in the following descriptions are only some implementations of the present disclosure. Those of ordinary skill in the art may further obtain other apparent variations according to these accompanying drawings without creative work.

Figure 1:
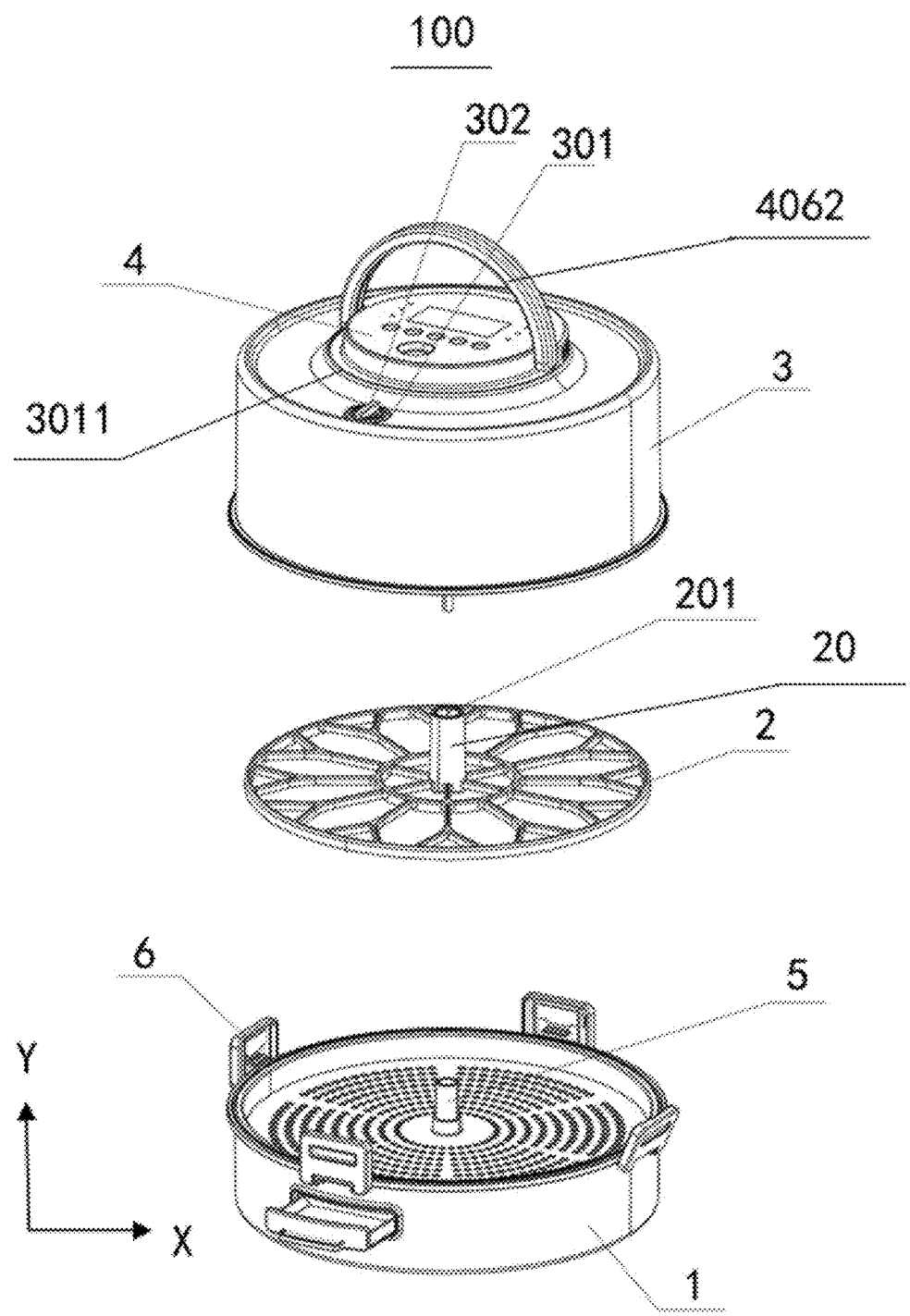
FIG. 1 is schematic exploded view of an egg incubator shown in a first viewing angle according to an implementation of the present disclosure.

The following specific embodiments will further illustrate the present disclosure in conjunction with the above accompanying drawings.

DETAILED DESCRIPTION

The technical solutions in the implementations of the present disclosure are clearly and completely described in the following in conjunction with the accompanying drawings of the present disclosure. It is apparent that the described implementations are only part of the implementations of the present disclosure, not all of the implementations. On the basis of the implementations of the present disclosure, all other implementations obtained on the premise of no creative work of those of ordinary skill in the art shall fall within the scope of protection of the present disclosure.

It should be appreciated that the terms in the specification and the claims of the present disclosure and the above-described accompanying drawings are used only to describe a particular embodiment, and are not intended to limit the present disclosure. The terms "first" and "second" in the specification and claims of the present disclosure and the above-described accompanying drawings are used to distinguish between different objects, and are not used to describe a particular order. The singular forms "one" and "the" are also intended to include the plural form unless the context clearly indicates otherwise. The term "including", and any variations thereof, is intended to cover non-exclusive inclusion. In addition, the present disclosure can be realized in many different forms and is not limited to the embodiments described herein. The following specific embodiments are provided to facilitate a clearer and more thorough understanding of the disclosure of the present disclosure, wherein the terms indicating orientation such as up, down, left, and right, are directed only to the position of the structure shown in the corresponding accompanying drawings. In the description of the present disclosure, it is to be noted that, unless otherwise expressly provided and limited, the terms "mounted", "connected", "connected", "arranged on . . . ", and "provided with" are to be understood in a broad sense. For example, the elements may be fixedly connected, detachably connected, or integrally connected. The elements may be mechanically connected. The elements may be directly connected, or indirectly connected through an intermediate medium. For a person of ordinary skill in the art, the specific meaning of the above terms in the present disclosure can be understood in specific cases.

As illustrated in FIG. 1 and FIG. 8 to FIG. 11, an implementation of the present disclosure provides an egg incubator 100 with a precision adjustment function of humidity. The egg incubator 100 includes a hood 3, a rotation frame 2, and a host portion 4. The hood 3 is provided with an incubation compartment 7. The hood 3 is provided with an incubation compartment 7 and a mounting opening 3011 in air communication with the incubation compartment 7. The rotation frame 2 is arranged in the incubation compartment 7 and configured to carry an incubated egg. The host portion 4, arranged at the mounting opening 3011. The host portion 4 includes a housing 401, a fan 415, an exhaust valve 42, a humidity sensor 417, and a main control circuit board 403. The main control circuit board 403 is electrically connected to the fan 415, the exhaust valve 42, and the humidity sensor 417. The housing 401 is provided with a work compartment 408, a circulation air inlet 418, a circulation air outlet 420, and a valve opening 4061. The circulation air inlet 418 and the circulation air outlet 420 are in air communication with the work compartment 408 and the incubation compartment 7. The valve opening 4061 is in air communication with the work compartment 408 and outside air. The fan 415 is arranged in the work compartment 408. The exhaust valve 42 is arranged at the housing 401 and is configured to open or close the valve opening 4061. The housing 401 is provided with a humidification tank 4011 in a path of airflow providing by the fan 415, and the humidity sensor 417 is configured to detect air humidity in the incubation compartment 7. The incubation compartment 7, the circulation air inlet 418, the work compartment 408, and the circulation air outlet 420 are sequentially in air communication to form an internal circulation air path 425. The incubation compartment 7, the circulation air inlet 418, the work compartment 408, and the valve opening 4061 are sequentially in air communication to form an external circulation air path 421. When the air humidity in the incubation compartment 7 detected by the humidity sensor 417 is less than a first preset humidity threshold, the main control circuit board 403 controls the exhaust valve 42 to close the valve opening 4061, and the airflow providing by the fan 415 is in contact with humidification liquid stored in the humidification tank 4011 and circulates between the work compartment 408 and the incubation compartment 7 by the internal circulation air path 425. When the air humidity in the incubation compartment 7 detected by the humidity sensor 417 is greater than a second preset humidity threshold, the main control circuit board 403 controls the exhaust valve 42 to open the valve opening 4061, and the airflow providing by the fan 415 is discharged to the outside air by the external circulation air path 421.

It should be noted that the first preset humidity threshold and the second humidity may be user-defined or set by system default, and the implementations of the present disclosure are not specifically limited. The first preset humidity threshold and the second humidity threshold may be the same or different. For example, the egg incubator 100 includes a plurality of incubation stages. In the same incubation stage, the first preset humidity threshold is less than or equal to the second humidity. At different incubation stages, the first predetermined humidity may be greater than, or less than, or equal to the second humidity. The first preset humidity threshold and the second preset humidity threshold may be set according to factors such as the incubation stage and the incubation parameters of the incubated egg to be incubated. The embodiments of the present disclosure are not specifically limited. Specifically, when the first preset humidity threshold is less than the second humidity threshold and the air humidity in the incubation compartment 7 detected by the humidity sensor 417 is greater than or equal to the first preset humidity threshold and less than or equal to the second humidity threshold, the main control circuit board 403 controls the exhaust valve 42 to close the valve opening 4061 and controls the fan 415 to stop working or controls an infusion member 411 of the egg incubator 100 to stop delivering humidification fluid to the humidification tank 4011. Thereby, a problem of frequent switching of the operating mode (dehumidifying operation or humidifying operation) of the egg incubator 100 when the air humidity in the incubation compartment 7 detected by the humidity sensor 417 reaching a critical value is avoided, thus increasing the service life of the egg incubator 100. When the first preset humidity threshold is equal to the second humidity threshold and the air humidity in the incubation compartment 7 detected by the humidity sensor 417 is equal to the first preset humidity threshold or the second humidity threshold, the main control circuit board 403 controls the exhaust valve 42 to close the valve opening 4061 and controls the fan 415 to stop working, or the main control circuit board 403 controls the exhaust valve 42 to close the valve opening 4061, the airflow providing by the fan 415 is in contact with humidification liquid stored in the humidification tank 4011 and circulates between the work compartment 408 and the incubation compartment 7 by the internal circulation air path 425, or the main control circuit board 403 controls the exhaust valve 42 to open the valve opening 4061, and the airflow providing by the fan 415 is discharged to the outside air by the external circulation air path 421.

The egg incubator 100 with the precision adjustment function of humidity is provided by the present disclosure. On a first aspect, according to the setting of humidity sensor 417 that monitors the air humidity in the incubation compartment 7 of the egg incubator 100, the air humidity in the incubation compartment 7 may be accurately adjusted, which ensures the stability of the air humidity of incubation environments in the incubation compartment 7, improves the air quality of the incubation compartment 7, improves the effect of hatching eggs, as well as to realizes the automated control of the air humidity in the incubation compartment 7 of the egg incubator 100 to save the cost of manpower. On a second aspect, the egg incubator 100 may realize a humidifying function or a dehumidifying function by setting different airflow paths under the humidification work and the dehumidification work, which realizes even distribution of moisture, avoids local over-humidification or over-drying, improves humidifying and dehumidifying effect, and reduces energy consumption. On a third aspect, the egg incubator 100 adopts the same fan 415 to realize humidification or dehumidification work, which simplifies operation, saves cost, reduces components, improves the integration degree of host portion 4, and realizes the miniaturized design of the egg incubator 100.

The egg incubator 100 refers to a device that artificially simulates the conditions of temperature, humidity, egg turning and other conditions of the mother of an oviparous animal to develop a fertilized egg into life through a certain period of time. The incubated egg may be, but is not limited to, a chicken egg, a duck egg, a goose egg, and the like.

For accuracy of description, please refer to FIG. 1 whenever orientation is involved herein. The term "horizontal direction X" refers to any direction within the carrying surface for carrying the egg incubator 100, i.e., left and right directions. The carrying surface is a surface parallel to the horizon and perpendicular to a direction of gravity of the egg incubator 100. The term "height direction Y" means a direction perpendicular to the carrying surface for carrying the egg incubator 100, i.e., the up and down direction. Among them, the horizontal direction X and the height direction Y together constitute two orthogonal directions of the egg incubator 100. For the convenience of description, the horizontal direction X and the height direction Y in the present disclosure are relative positions and do not constitute a limitation to realize the limitation. The horizontal direction X and the height direction Y can be customized according to the specific structure of the product and the perspective presented in the accompanying drawings, and the present disclosure is not specifically limited.

It may be noted that FIG. 1 is intended only to schematically depict the arrangement of the hood 3, the rotating frame 2 and the host portion 4, and is not intended to be a specific limitation on the connection position, connection relationship, and specific construction of the various components. FIG. 1 is only a structure of the egg incubator 100 schematically depicted in the embodiment of the present disclosure, and does not constitute a specific limitation of the egg incubator 100. In other embodiments of the present disclosure, the egg incubator 100 may include more or fewer components than shown in FIG. 1, or a combination of certain components, or different components, for example, the egg incubator 100 may also include, but is not limited to, a communication module, a sterilization module, and the like. The communication module is capable of receiving a command from a mobile device. The mobile device may be, but is not limited to, a cell phone, a computer, a remote control, and the like. The command can be, but is not limited to, temperature adjustment command, humidity adjustment command, and the like. The sterilizing module can be configured to perform a sterilizing operation on an internal environment of the incubation compartment 7.

In some embodiments, the host portion 4 further includes an absorbent 416. The absorbent 416 is arranged in the humidification tank 4011. Thus, on the one hand, the absorbent 416 can increase a surface area of the humidification liquid stored in the humidification tank 4011, which accelerates the evaporation of the humidification liquid, and improves the humidification efficiency, on the other hand, the absorbent can promote uniform distribution of the humidification liquid, which avoids localized over-wetting or over-drying, and ensures uniform humidification, and on an another hand, the absorbent can adsorb and store the humidification liquid, which reduces a risk of leakage of the humidified liquid, and improves the cleanliness of the egg incubator 100. The absorbent 416 may be, but is not limited to, at least one of a sponge, cotton, a fiber structure, a non-woven fabric, a porous ceramic, or other water-absorbing structure. Exemplarily, In the embodiment, the absorbent 416 is configured as the sponge. The humidification tank 4011 is arranged around a rotation axis P of the rotation frame 2 in at least one circle. The absorbent 416 is also arranged around a rotation axis P of the rotation frame 2 in at least one circle. Exemplarily, In the embodiment, the humidification tank 4011 is arranged around a rotation axis P of the rotation frame 2 in one circle. The absorbent 416 is configured as an annular structure. The annular structure may be an open loop structure or a closed loop structure. Thus, the airflow providing by the fan 415 is enabled to spread the moisture evenly in the incubation compartment 7, which avoids localized over-wetting or over-drying, and improves the efficiency of egg hatching. Of course, in some embodiments, the absorbent 416 may also be configured as a plurality of block structures. The plurality of block structures are arranged in spaced rows around a center of the humidification tank 4011. In some other embodiments, the water-absorbing structure may also be configured as a granular structure.

In some embodiments, a bottom wall of the humidification tank 4011 is provided with a support strip 4012. The support strip 4012 is configured to support the absorbent 416. Thus, the support strip 4012 is capable of lifting the absorbent 416 up to a predetermined height, which increases a contact area between the absorbent 416 and the outside air, and improves a rate at which the humidified liquid within the absorbent 416 enters into the airflow, improves a humidification effect within the egg incubator 100, improves the moisture content in the airflow, and provides a better experience of using the egg incubator 100. Exemplarily, In the embodiment, the bottom wall of the humidification tank 4011 is provided with a plurality of the support strips 4012, and the plurality of the support strips 4012 are provided in a radial row from the center of the humidification tank 4011.

Exemplarily, In the embodiment, the humidification tank 4011 is arranged at a location of the housing 401 proximal to the circulation air inlet 418. Thus, on the one hand, the airflow drawn in the circulation air inlet 418 can act more on the absorbent 416, which improves the humidification efficiency, on the other hand, the absorbent 416 can also adsorb dust and particulate matter in the airflow from the circulation air inlet 418, which plays a preliminary filtering role and improves the air quality inside the incubation compartment 7.

In some embodiments, the exhaust valve 42 includes an electric exhaust door 422 and a door motor 423. The electric exhaust door 422 is removably arranged on the housing 401. The door motor 423 is in transmission connection with the electric exhaust door 422. The door motor 423 is configured drive the electric exhaust door 422 to open or close the valve opening 4061. Thus, the a door motor 423 can drive the electric exhaust door 422 to open or close the valve opening 4061, on the one hand, the automated moisture discharge function of the egg incubator 100 is realized, which reduces the manpower cost, on the other hand, it is possible to achieve precise adjustment of a size of the valve opening 4061 to control parameters such as the flow rate of the moisture discharge and a pressure of the incubation compartment 7, which improves the operational efficiency of the egg incubator 100.

Exemplarily, In the embodiment, the housing 401 includes a housing body 4015 and an end cover 4016. The housing body 4015 is coupled to the end cover 4016 to form the work compartment 408. The end cover 4016 is provided with the valve opening 4061. The housing body 4015 is provided with a guiding air duct 4018. The guiding air duct 4018 is in air communication with the valve opening 4061 and the work compartment 408. An inlet end of the guiding air duct 4018 faces towards the fan 415, and an outlet end of the guide air duct 4018 faces towards the valve opening 4061. Thus, the arrangement of the guide air duct 4018 can reduce the flow resistance of discharging the air inside the incubation compartment 7 to the outside air, which improves the moisture removal effect.

Exemplarily, In the embodiment, the exhaust valve 42 further includes a transmission gear 424. The door motor 423 is in transmission connection with the transmission gear 424. The electric exhaust door 422 is provided with a tooth rack 4221 engaged with the transmission gear 424. Thus, on a first aspect, the meshing transmission of the transmission gear 424 and the tooth rack 4221 can reduce vibration and impact, which improves the smoothness and accuracy of the movement of the electric exhaust door 422 relative to the end cover 4016, and extend the service life of the exhaust valve, on a second aspect, the transmission gear 424 and the tooth rack 4221 have a simple structure, which are easy to maintain, and are capable of withstanding large loads; on a third aspect, the transmission efficiency of the transmission gear 424 and the tooth rack 4221 can be improved, which reduces energy loss, and reduces operating costs, and on a fourth aspect, the transmission gear 424 and the tooth rack 4221 can realize a self-locking function by design, which prevents accidental movement of the electric exhaust door 422 with respect to the end cover 4016, and improves the safety of the use of the exhaust valve 42. Of course, in some embodiments, the transmission gear 424 may be omitted, and an output shaft of the door motor 423 directly drives the door motor 423 to move relative to the housing 401.

As illustrated in FIG. 1 and FIG. 7 to FIG. 11, In the embodiment, the egg incubator 100 further includes a top cover 406. The top cover 406 is coupled to the end cover 4016 to form a circuit compartment 402 and an exhaust compartment 4013. The circuit compartment 402 is located above the work compartment 408 and is arranged in isolation from the exhaust compartment 4013. The main control circuit board 403 is arranged in the circuit compartment 402. The top cover 406 is provided with an exhaust hole 4014. and the exhaust hole 4014 is in air communication with the exhaust compartment 4013 and the outside air. Thus, since the main control circuit board 403 is located above the work compartment 408 and arranged in isolation from the exhaust compartment 4013, a problem of damage to the main control circuit board 403 and the functional elements provided on the main control circuit board 403 due to moisture within the humidity entering the circuit compartment 402 can be avoided.

The top cover 406 is sealingly mounted at the mounting opening 3011 of the hood 3, thus avoiding the erosion of the main control circuit board 403 and other electrical components caused by outside dust, moisture and other debris entering the circuit compartment 402, and thereby extending the service life of the main control circuit board 403. The top cover 406 and the host portion 4 can be coupled to form an integral structure, thus improving the integration degree of the egg incubator 100 and facilitating maintenance and assembly. Of course, the top cover 406 and the host portion 4 may be arranged independently of each other.

In some embodiments, the hood 3 is provided with a manual exhaust opening 301. The egg incubator 100 further includes a manual exhaust switch 302. The manual exhaust switch 302 is arranged at the manual exhaust opening 301. The manual exhaust switch 302 is configured to open or close the manual exhaust opening 301. Thus, the exchange of air between the incubation compartment 7 and the outside air is realized, which improves the environment inside the incubation compartment 7, and improves the egg hatching effect. Of course, in some embodiments, the manual exhaust opening 301 may also be configured as an automatic exhaust opening, thereby improving the automation function of the egg incubator 100 and saving labor costs. An overall structure of the hood 3 is configured as a transparent structure, thereby facilitating a user to observe the incubated egg within the incubation compartment 7, providing light to the incubated egg to be incubated, and thereby improving the incubation effect. Of course, in some embodiments, a part portion of the hood 3 may also be configured as a transparent structure, and a remaining portion of the hood 3 may be configured as a non-transparent structure.

In some embodiments, an inner side wall of the housing body 4015 is provided with a support boss 4017. The housing further includes a motor support partition 409. The motor support partition 409 is arranged in the work compartment 408 and carried on the support boss 4017. The motor support partition 409 is configured to separate the work compartment 408 to form a first compartment 4081 and a second compartment 4082. The motor support partition 409 is provided with a ventilation outlet 419. The ventilation outlet 419 is in air communication with the first compartment 4081 and the second compartment 4082. The housing body 4015 is provided with the circulation air inlet 418 in an area corresponding to the first compartment 4081, and the housing body 4015 is provided with the circulation air outlet 420 in an area corresponding to the second compartment 4082. Thus, on the one hand, the first compartment 4081 and the second compartment 4082 are separated by the motor support partition 409, thereby facilitating precise control of the direction and flow of the airflow, preventing turbulence of the airflow, and realizing precise regulation of the humidification, and on the other hand, the first compartment 4081 is capable of buffering the airflow, so that the air in the incubation compartment 7 can act fully on the humidification liquid in the humidification tank 4011 after the circulation air inlet 418, thereby improving the humidity uniformity of the air, and thereby enhancing the egg hatching effect.

Exemplarily, In the embodiment, the first compartment 4081 is located below the second compartment 4082, so that when the egg incubator 100 enters a dehumidification operation, the exhaust path can be shortened, and the structural design is reasonable and compact. Of course, in some embodiments, the first compartment 4081 is located above or beside the second compartment 4082, and the embodiment of present disclosure is not specifically limited.

The housing body 4015 is configured as a cone-shaped structure. A cross-section area of the housing 401 decreases gradually from top to bottom in the height direction Y of the egg incubator 100. In other words, a top area of the housing 401 is greater than a bottom area of the housing 401. Thus, on the one hand, a discharge area of the circulation air outlet 420 is increased, which improves the circulation of humidity between the work compartment 408 and the incubation compartment 7, and improves the humidification efficiency, on the other hand, the second compartment 4082 is able to have more space for assembling electrical components electrically connected with the main control circuit board 403, which makes the structure of the egg incubator 100 layout reasonable and compact, and on an another hand, the airflow from the incubation compartment 7 into the work compartment 408 via the circulation air inlet 418 can pass through the fan 415 in order to even out the uniformity of the moisture in the air, which improves the hatching efficiency of the egg incubator 100.

In some embodiments, the egg incubator 100 further includes a water storage box 1. The host portion further includes an infusion member 411. The infusion member 411 is provided in the work compartment 408 and configured to deliver the humidification liquid from the water storage box 1 to the humidification tank 411. Thus, on the one hand, the egg incubator 100 does not require an external water source, which enhances the aesthetics of the egg incubator 100, and on the other hand, the water storage box 1 is capable of storing the humidification liquid, which improves the continuous automatic humidifying ability of the egg incubator 100 and ensures the stable operation of the egg incubator 100. Specifically, the infusion member 411 is mounted on the motor support partition 409, and an outlet of the infusion member 411 is conveyed to the humidification tank 4011 through the ventilation outlet 419.

Of course, in some embodiments, the water storage box 1 and the infusion member 411 may also be omitted, and the user may manually add humidification fluid to the humidification tank 4011, or an external water source may be directly connected via a direct connection between the infusion member 411. The humidification fluid may include, but is not limited to, at least one of natural water, sterile fluids, trace components, antioxidants, moisturizers, victory salts, antimicrobial agents, and the like.

The hood 3 is located above the water storage box 1, and the hood 3 is removably and sealingly coupled to the water storage box 1 to form an incubation compartment 7. Thus, on the one hand, the water storage box 1 is able to serve as a part of the housing of the egg incubator 100, which reduces the number of structural components, and makes the structure of the egg incubator 100 layout reasonable and compact, and on the other hand, the connection of the water storage box 1 to the hood 3 facilitates operations such as maintenance, replacement, the incubated egg or component inspection operations, as well as operations such as cleaning and replacement of the water storage box 1. Exemplarily, the hood 3 is detachably connected to the water storage box 1 by a clasp 6, thereby facilitating operation. Of course, in some embodiments, the hood 3 and the water storage box 1 may also be detachably connected together by a bolt structure, a threaded structure, a magnetic structure, etc. Of course, in some embodiments, the water storage box 1 and the hood 3 are provided independently of each other, thereby enriching the scenarios for the use of the egg incubator 100.

In some embodiments, the infusion member 411 is configured as a peristaltic pump. It should be appreciated that, the infusion member 411 is configured as the peristaltic pump, on the one hand, the peristaltic pump is capable of precise delivery of the humidification liquid in the humidification tank 4011, which improves the accuracy of the humidity control of the egg incubator 100, and on the other hand, the peristaltic pump is equipped with a self-priming function, which can be activated without filling the pump, and has a simple structure and a valve-less structure, which reduces clogging and abrasion, and improves the stability and reliability of the infusion member 411 for the delivery of the humidification liquid. In some embodiments, the infusion member 411 may also be configured as other infusion structures, such as, but not limited to, a water flow switch, a centrifugal pump, a diaphragm pump, or a plunger pump.

As illustrated in FIG. 1, FIG. 2, FIG. 3, and FIG. 11, exemplarily, In the embodiment, the water storage box 1 includes a bottom box 101 and a box lid 102. The bottom box 101 is provided with a water storage compartment 104. The box lid 102 is arranged on a top of the bottom box 101. The host portion 4 further includes an inlet pipe 414. One end of the inlet pipe 414 is in liquid communication with the water storage compartment 104, and an another end of the inlet pipe 414 is threaded through the housing 401 and in liquid communication with the infusion member 411. Thus, the delivery path between the infusion member 411 and the water storage compartment 104 is shortened, which saves cost and is compact. Exemplarily, In the embodiment, the inlet pipe 414 is sealingly passed through a middle of a bottom wall of the housing 401, and the humidification tank 4011 is arranged around peripheral edges of the inlet pipe

414, thereby facilitating the airflow generated by the fan 415 to disperse the humidification liquid uniformly to the incubation compartment 7, and improving the incubation efficiency of the egg incubator 100. Of course, in some embodiments, the inlet pipe 414 may also be passed through a side wall of the housing 401.

As illustrated in FIG. 1 and FIG. 5 to FIG. 7, the infusion member 411 is mounted on the motor support partition 409 and located in the second compartment 4082. Thus, on the one hand, the motor support partition 409 can be used to support the infusion member 411, which improves the reliability and stability of the connection between the infusion member 411 and the housing 401, and on the other hand, the distance between the infusion member 411 and the main control circuit board 403 is shortened, which simplifies a connecting line between the infusion member 411 and the main control circuit board 403, improves the reliability and safety of the assembly. Of course, in some embodiments, the infusion member 411 may be directly mounted on at least one of the end cover 4016 and the housing 4015, and the embodiment of the present disclosure is not specifically limited.

Exemplarily, In the embodiment, the motor support partition 409 includes a carrier plate 4091 and a base 4092. The base 4092 is provided with the ventilation outlet 419 and an accommodation groove 4093. The accommodation groove 4093 is in air communication with the second compartment 4082 and the ventilation outlet 419. The infusion member 411 is accommodated in the accommodation groove 4093. The carrier plate 4091 is coupled to the base 4092 at an edge of the accommodation groove 4093 and carried on the support boss 4017. The fan 415 is located above the carrier plate 4091 and faces towards the accommodation groove 4093.

Thus, on the one hand, the accommodation groove 4093 can play a positioning role for the assembly of the infusion member 411, which improves the accuracy of the alignment and installation of the infusion member 411 and the motor support partition 409, and on the other hand, since the fan 415 is located above the carrier plate 4091 and faces towards the accommodation groove 4093, the fan 415 can better suction the air inside the accommodation groove 4093, which improves the moisture circulation effect, makes the fan 415 have enough space to rotate, and makes the structure of the egg incubator 100 layout reasonable and compact.

In the embodiment, an orthographic projection of an open end of the accommodation groove 4093 in the height direction Y of the egg incubator 100 is located within an orthographic projection of the fan 415 in the height direction Y of the egg incubator 100. In other words, an outer diameter of the fan 415 is larger than an outer diameter of the open end of the accommodation groove 4093, which enables to push more air and increase the air volume, and improves the humidification effect.

In the embodiment, the absorbent 416 is located within the first compartment 4081. An orthographic projection of the ventilation outlet 419 in a height direction Y of the egg incubator 100 is located within an orthographic projection of the absorbent 416 in the height direction Y of the egg incubator 100. Thus, the humidification liquid delivered by an output end of the infusion member 411 is capable of dripping onto the absorbent 416 after passing through the ventilation outlet 419, which avoids a problem of the humidification liquid leaking into the incubation compartment 7 and affects the hatching of the incubated egg.

In some embodiments, the absorbent 416 abuts against a bottom wall of the motor support partition 409 in the height direction Y of the egg incubator 100. Thus, a risk of humidification fluid output from the output end of the infusion member 411 expanding through the ventilation outlet 419 along the bottom wall of the motor support partition 409 to an area outside of the absorbent 416 may be reduced, and a transmission path of the humidification fluid is shortened, which improves the absorption of the humidification fluid by the absorbent 416, and improves the humidification and hatching of the egg incubator 100.

Figure 2:
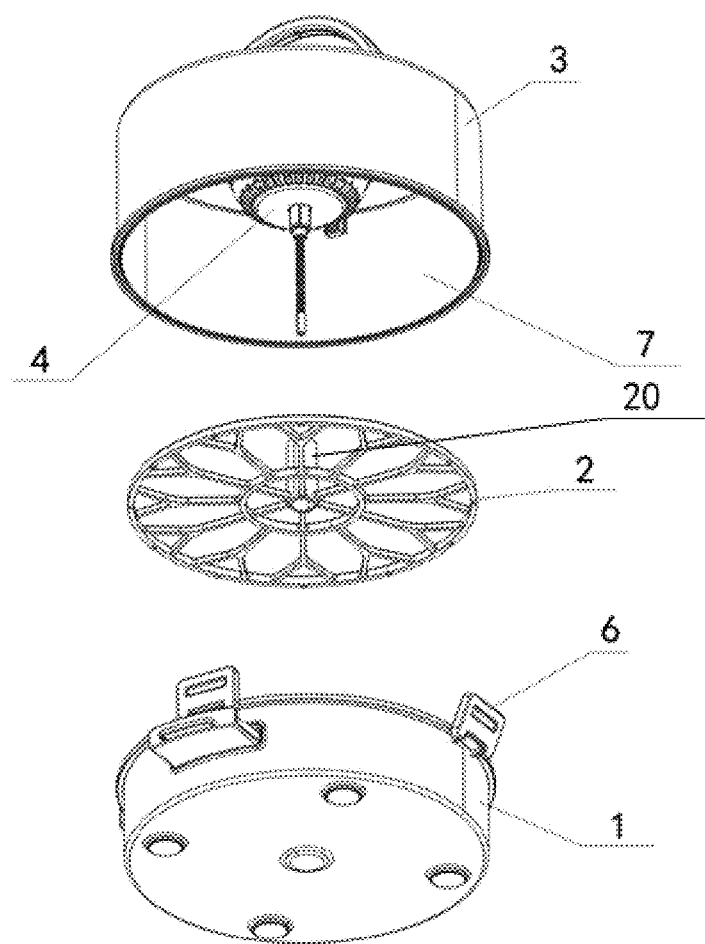
FIG. 2 is schematic exploded view of the egg incubator shown in a second viewing angle according to an embodiment of the present disclosure.
Figure 3:
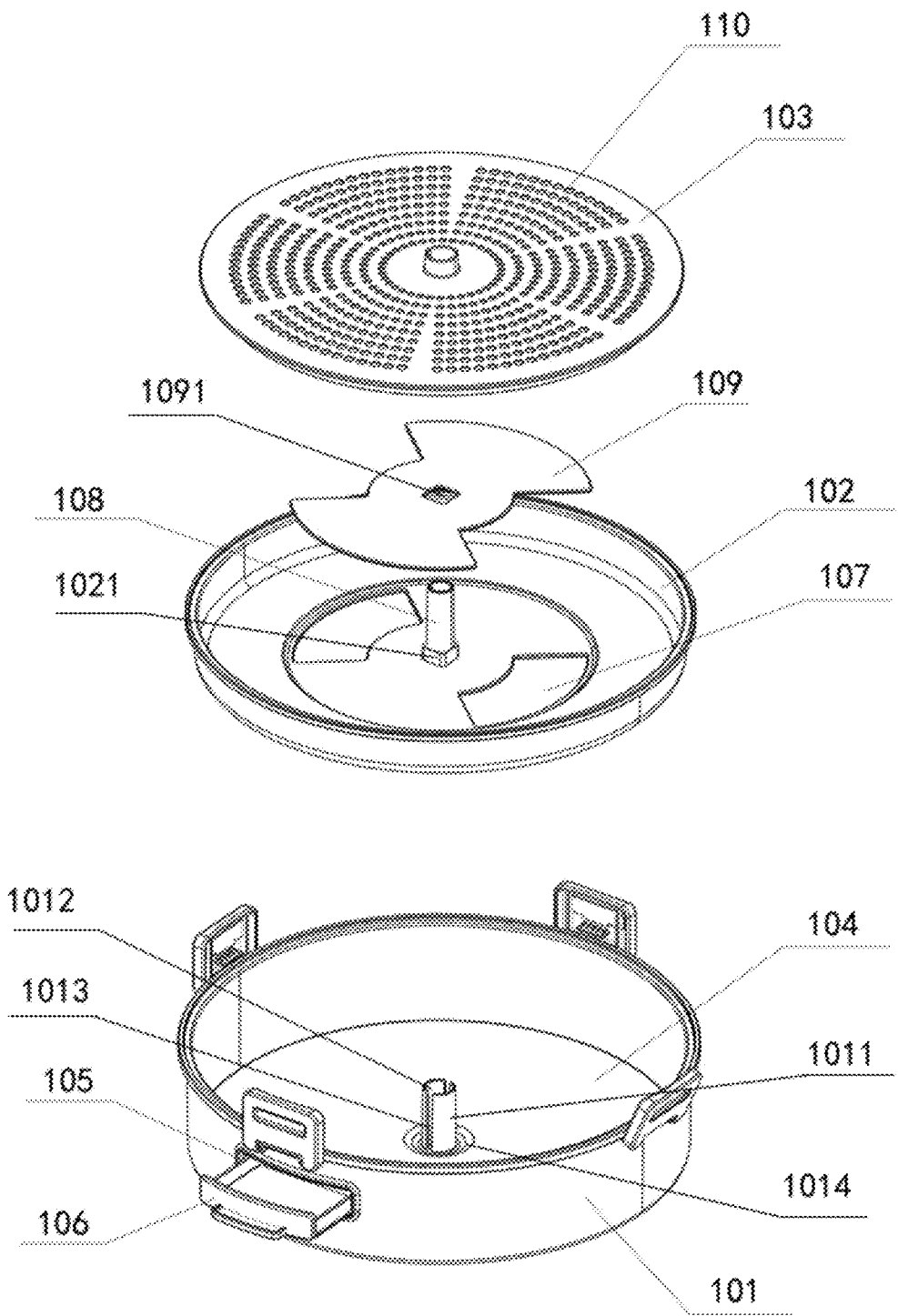
FIG. 3 is schematic exploded view of a water storage box of the egg incubator shown in a first viewing angle according to an embodiment of the present disclosure.
Figure 4:
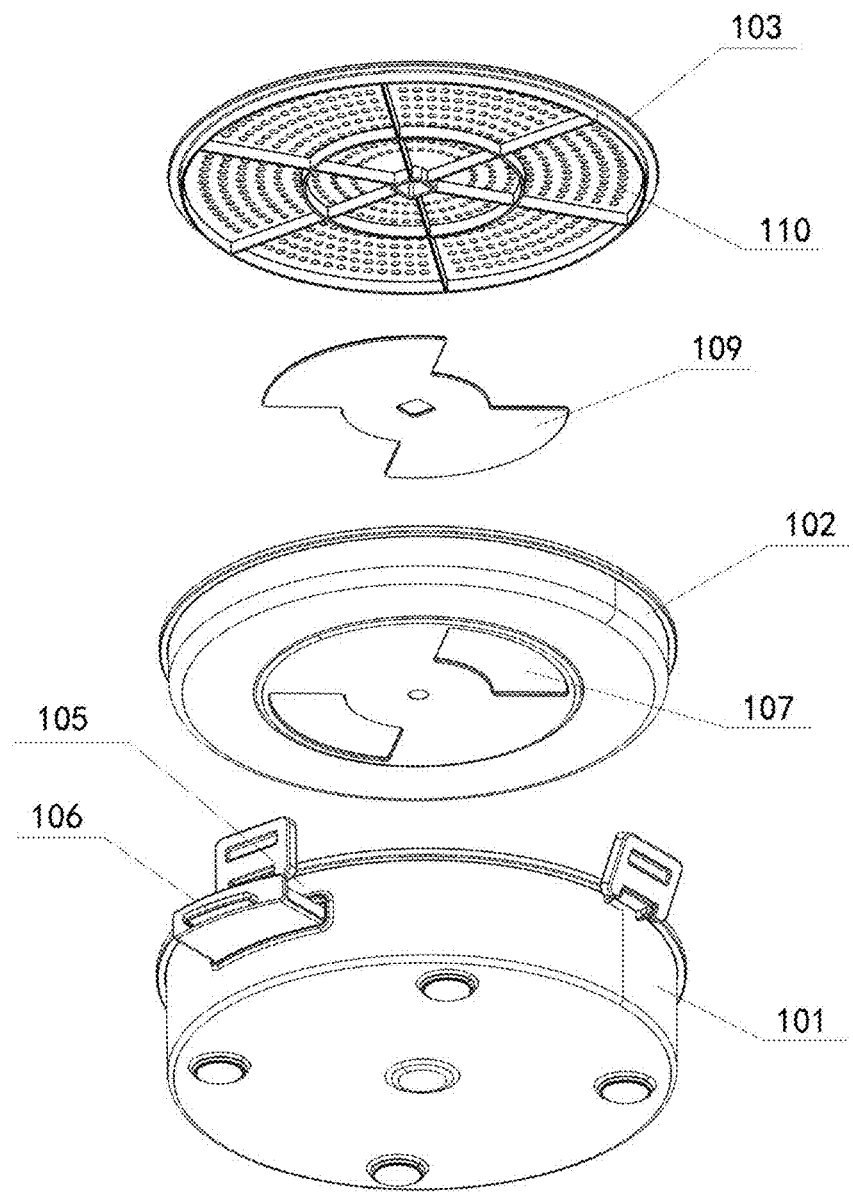
FIG. 4 is schematic exploded view of the water storage box of the egg incubator shown in a second viewing angle according to an embodiment of the present disclosure.
Figure 5:
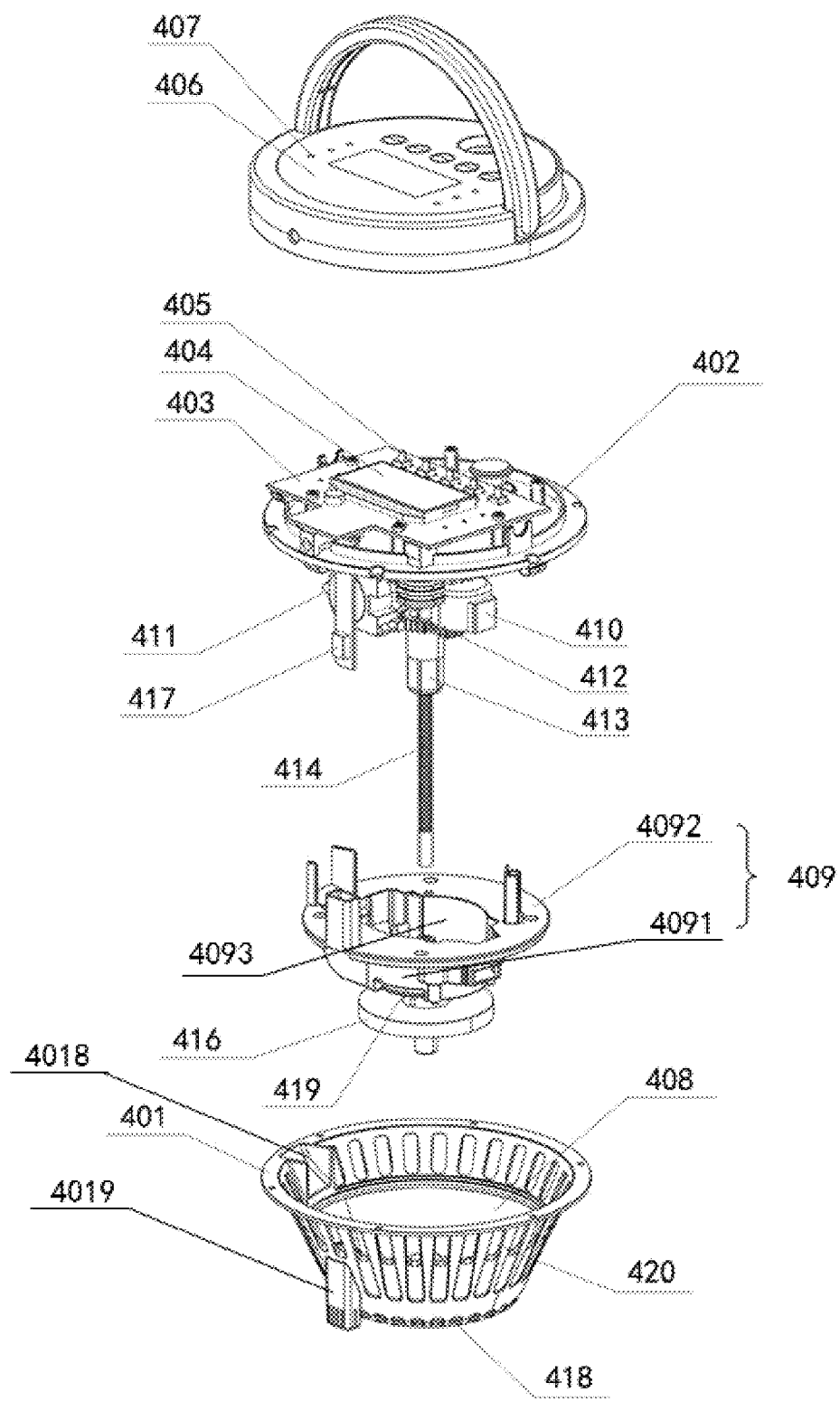
FIG. 5 is schematic exploded view of a host portion of the egg incubator shown in a first viewing angle according to an embodiment of the present disclosure.
Figure 6:
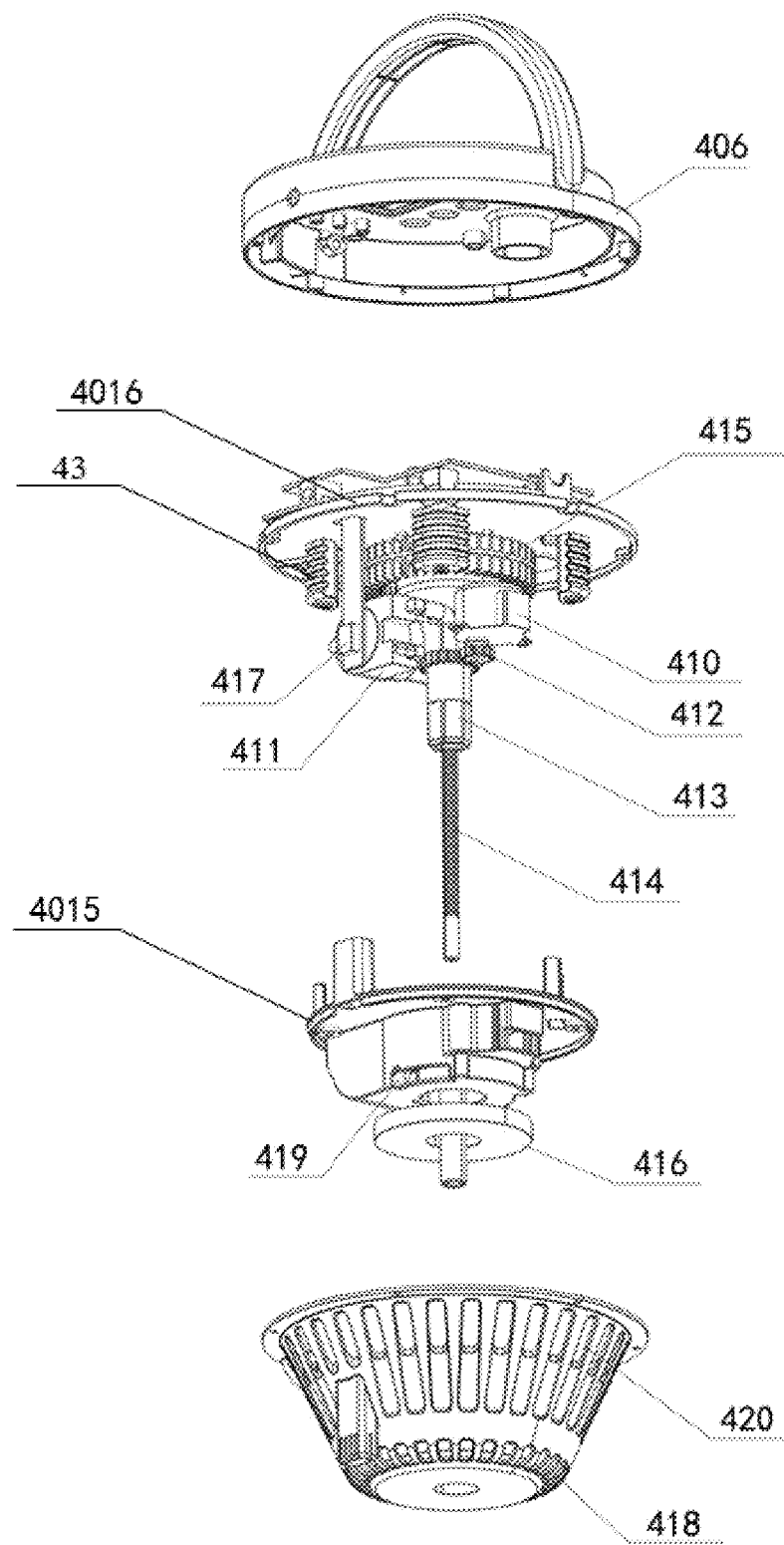
FIG. 6 is schematic exploded view of the host portion of the egg incubator shown in a second viewing angle according to an embodiment of the present disclosure.
Figure 7:
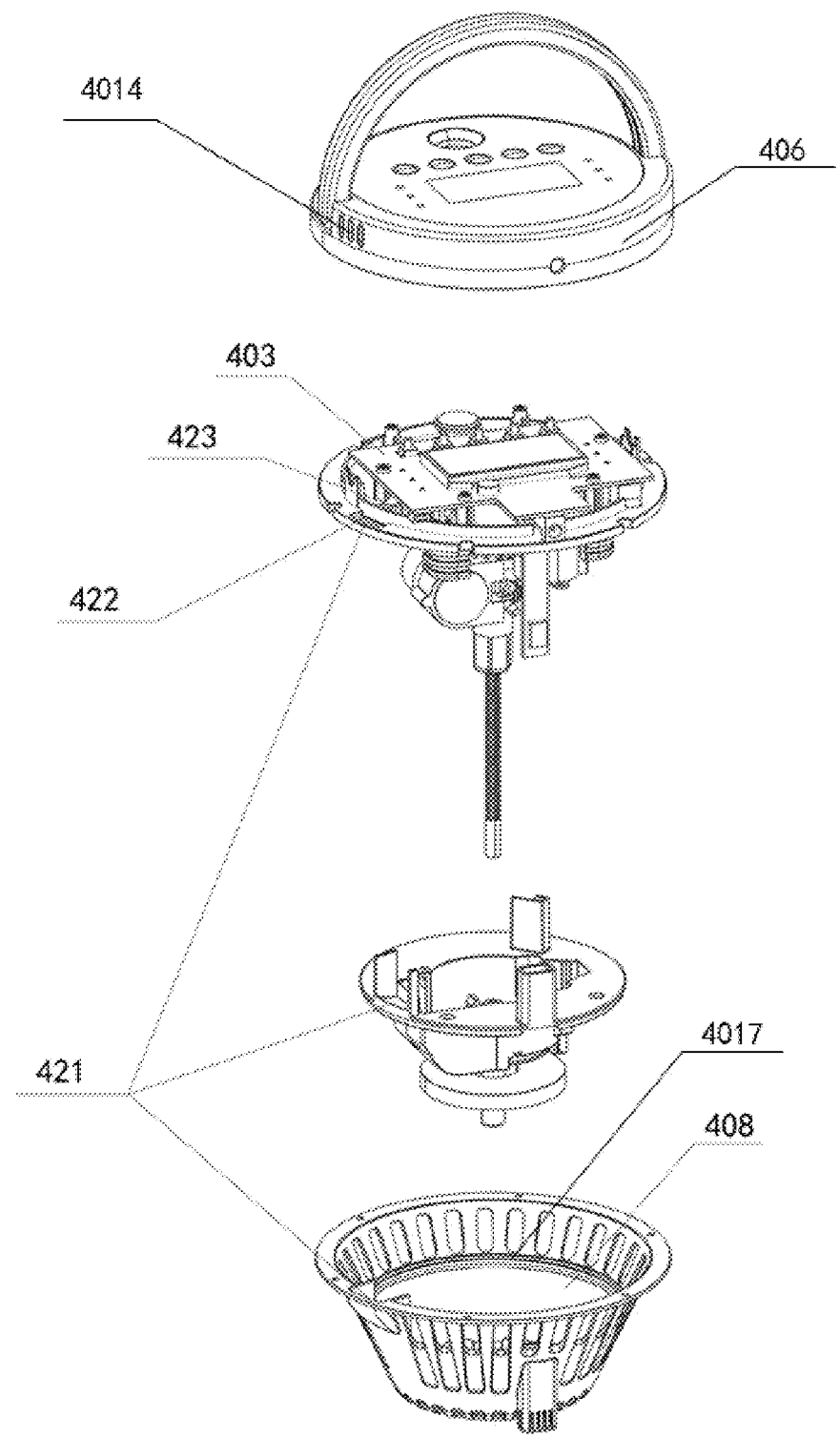
FIG. 7 is schematic exploded view of the host portion of the egg incubator shown in a third viewing angle according to an embodiment of the present disclosure.
Figure 8:
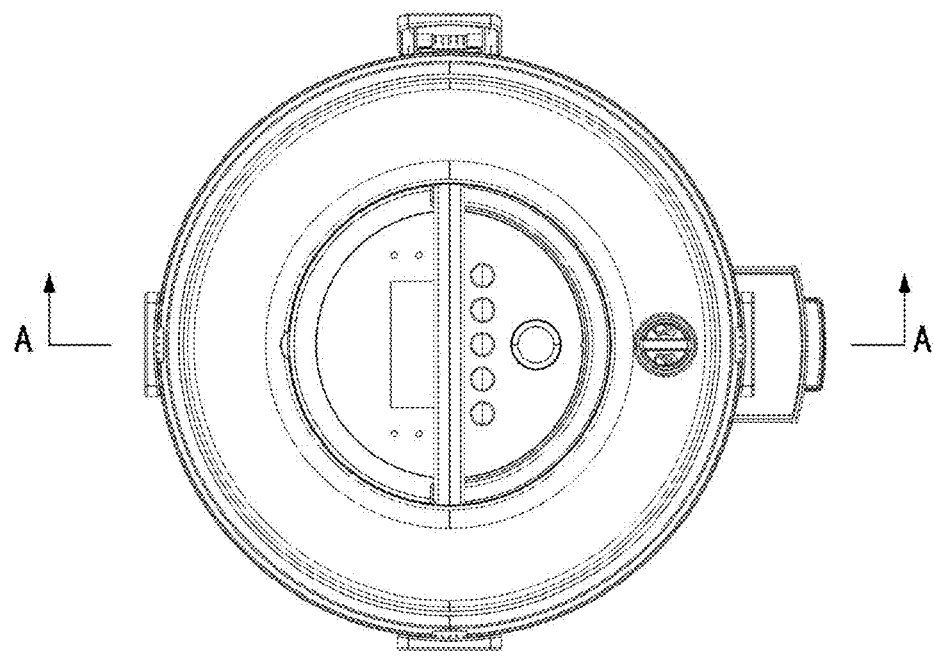
FIG. 8 is a top view of the egg incubator shown in a first viewing angle according to an embodiment of the present disclosure.
Figure 9:
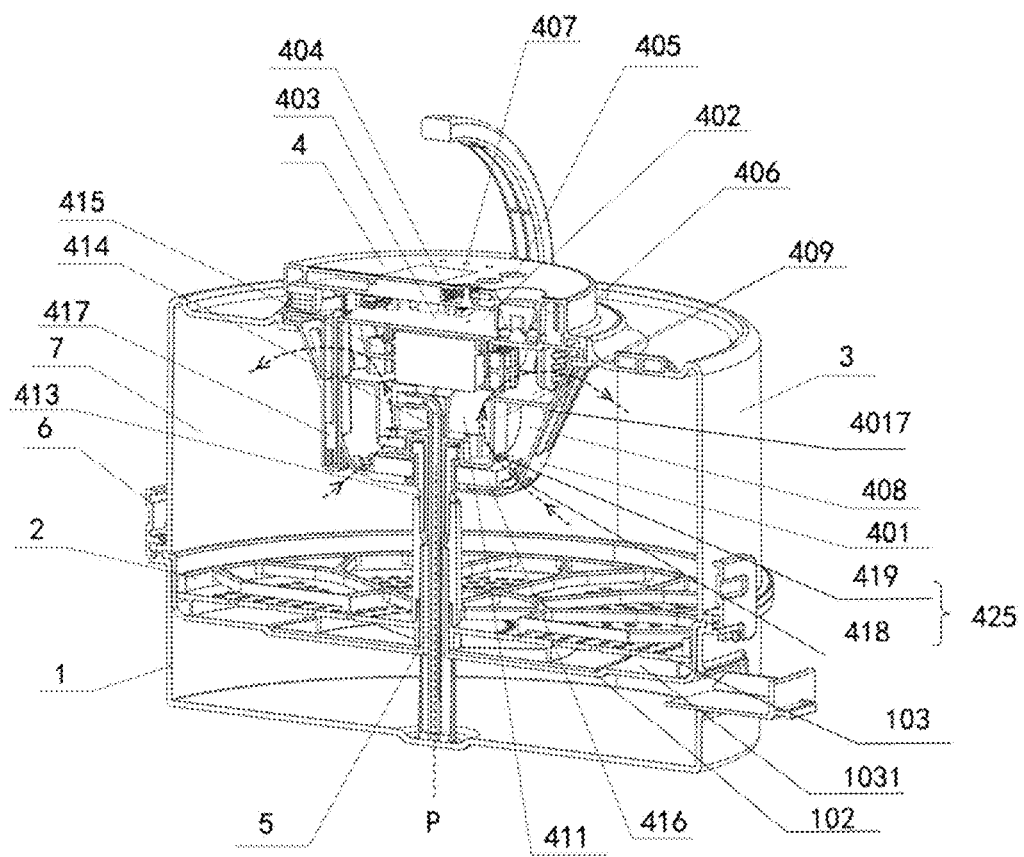
FIG. 9 is a cross-sectional view of the egg incubator taken along line A-A of FIG. 8 according to an embodiment of the present disclosure.
Figure 10:
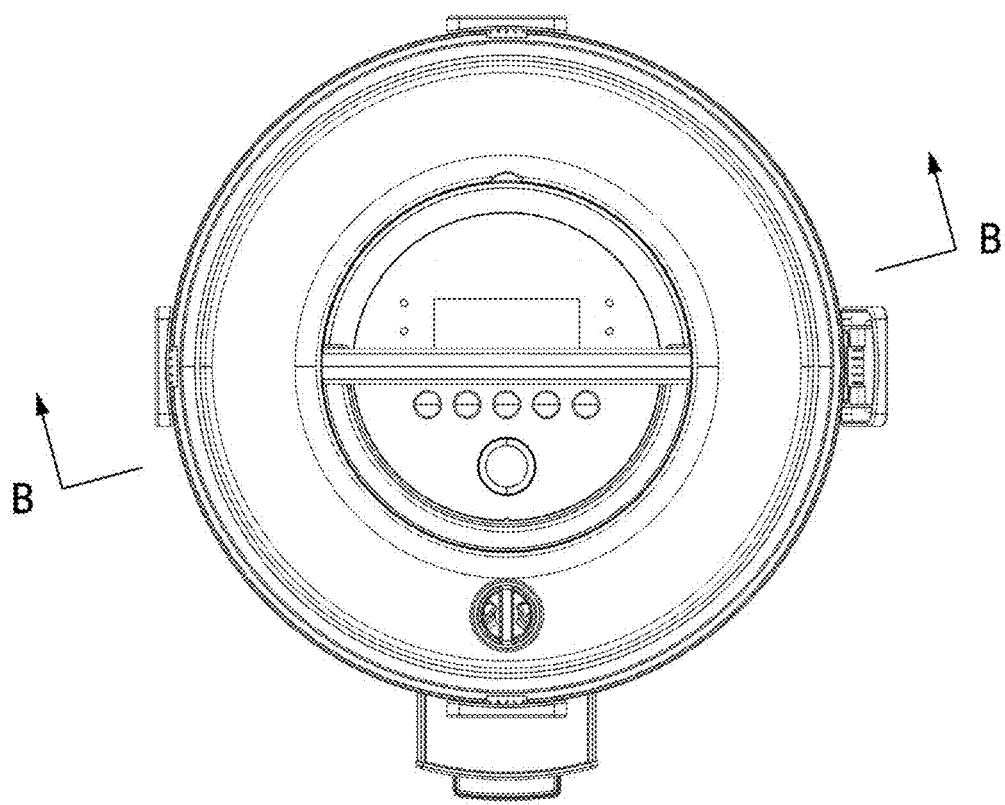
FIG. 10 is a top view of the egg incubator shown in a second viewing angle according to an embodiment of the present disclosure.
Figure 11:
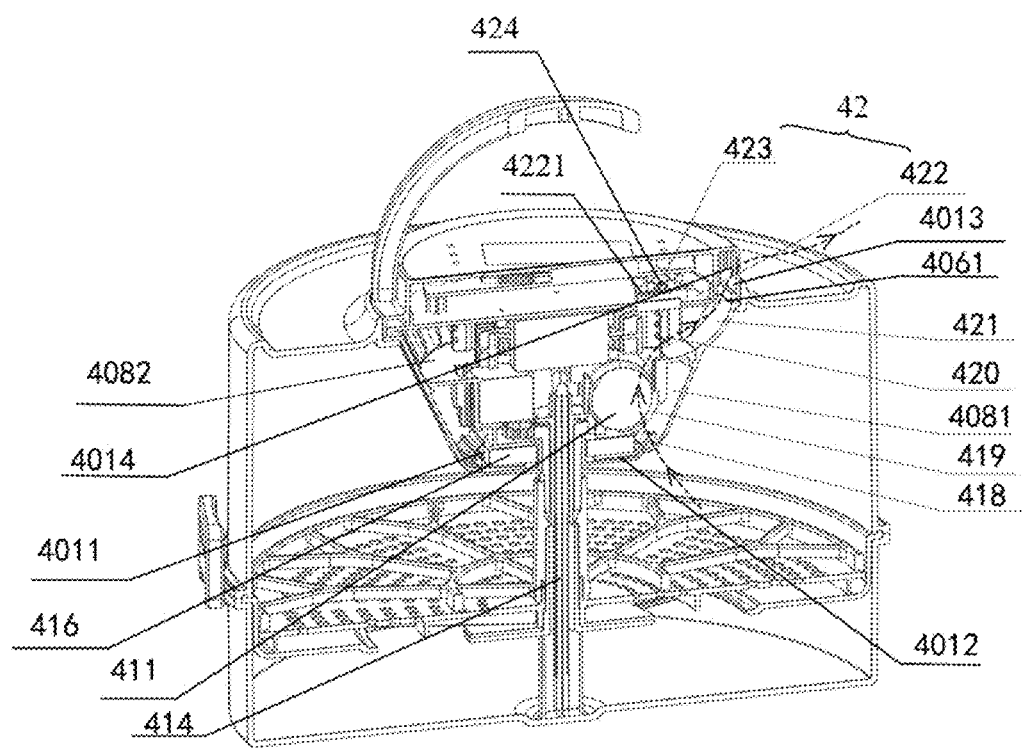
FIG. 11 is a cross-sectional view of the egg incubator taken along line B-B of FIG. 10 according to an embodiment of the present disclosure.
Figure 12:
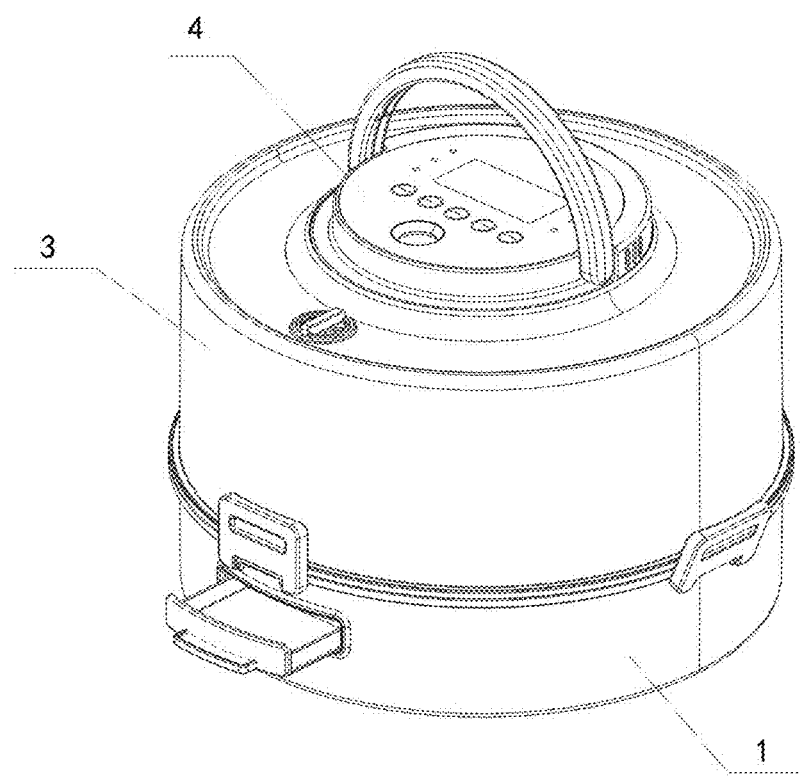
FIG. 12 is a schematic assembled view of the egg incubator of FIG. 1 according to an embodiment of the present disclosure.

As illustrated in FIG. 1 to FIG. 3, the box lid 102 is provided with a through opening 107. The through opening 107 is in air communication with the water storage compartment 104 and the incubation compartment 7. The water storage box 1 further comprises a movable cover plate 109. The movable cover plate 109 is coupled to the box lid 102 and configured to open or close the through opening 107. Thus, when the infusion member 411 malfunctions, the user can adjust the movable cover plate 109 to open the through opening 107 to enable the humidification liquid stored in the water storage compartment 104 to be exchanged with the air inside the incubation compartment 7, which improves the air humidity inside the egg incubator 100 and improving the hatching effect of the egg incubator 100. When the air humidity inside the incubation compartment 7 reaches the preset humidity threshold, the movable cover plate 109 can be adjusted to close the through opening 107, thereby improving the flexibility of using the egg incubator 100.

In some embodiments, the box lid 102 is provided with an anti-rotation projection 1021. The movable cover plate 109 is provided with an anti-rotation hole 1091. The anti-rotation projection 1021 is detachably fixed in cooperation with the anti-rotation hole 1091. Thus, the anti-rotation hole 1091 and the anti-rotation projection 1021 are detachably cooperatively fixed, thereby avoiding a problem of the movable cover plate 109 rotating with respect to the box lid 102 in the case of shaking and opening or closing the opening 107 by mistake, improving the reliability and safety of using the egg incubator 100, and thereby realizing the detachable connection between the movable cover plate 109 and the box lid 102, making the water storage box 1 have a simple structure. Of course, in some embodiments, the movable cover plate 109 and the box lid 102 may also be removably fixedly coupled together. For example, the movable cover plate 109 and the box lid 102 are removably fixedly coupled together by a screwing structure or a snap-fit structure.

Exemplarily, In the embodiment, the box lid 102 is provided with a shaft portion 108. The shaft portion 108 is configured as a hollow cylindrical structure. The inlet pipe 414 passes through an inner cavity of the shaft portion 108 and extends into the water storage compartment 104. The anti-rotation protrusion 1021 is arranged on an outer wall of the shaft portion 108. An edge of the box lid 102 lap over an edge of the bottom box 101, thereby realizing the sealing of the box lid 102 in connection with the bottom box 101.

In some embodiments, a bottom wall of the bottom box 101 is provided with a guide structure 1011. One end of the guide structure 1011 is coupled to the bottom box 101, and an another end of the guide structure 1011 backward to the bottom box 101 is coupled to the box lid 102. The guide structure 1011 is provided with an insertion slot 1012 and an inlet channel 1013. The insertion slot 1012 is configured to insert the inlet pipe 414. The inlet channel 1013 is in liquid communication with the insertion slot 1012 and the water storage compartment 104. Thus, on the one hand, the guide structure 1011 can act as a filtering structure, thereby preventing large-sized impurities from entering the inlet pipe 414 and clogging the inlet pipe 414, and on the other hand, the guide structure 1011 can act as a flow-restricting structure, thereby regulating the flow rate and flow velocity of the humidification liquid into the inlet pipe 414.

In some embodiments, the bottom wall of the bottom box 101 is provided with a sinking groove 1014 at a position corresponding to the guide structure 1011, thereby increasing the utilization rate of the humidification liquid in the water storage box 1. The sinking groove 1014 surrounds a peripheral edge of the guide structure 1011 and is connected to the inlet channel 1013.

In some embodiments, the egg incubator 100 further includes a rotation frame motor 410. The rotation frame motor 410 is mounted on the housing 401, and configured to drive the rotation frame 2 to rotate relative to the water storage box 1, thereby improving the uniformity of heat to the incubated egg carried on the rotation frame 2 or the uniformity of contact of the incubated egg carried on the rotation frame 2 with moisture, thereby improving the hatching effect and the hatching yield. Specifically, the rotation frame motor 410 is mounted on the motor support partition 409 and accommodated in the accommodation groove 4093, thereby improving the stability of the center of gravity of the egg incubator 100.

Exemplarily, In the embodiment. The rotation frame 2 is provided with a connection sleeve 20. The rotation frame motor 410 is provided with a rotation drive end 413. The rotation drive end 413 is fixedly coupled to the connection sleeve 20, thereby realizing that the rotation frame motor 410 drives the rotation drive end 413 to drive the connection sleeve 20 together with the rotation frame 2 in a rotating movement. The connection sleeve 20 is provided with a shaft hole 201. The shaft hole 201 is configured for the inlet pipe 414 to pass through. Specifically, the rotation drive end 413 is configured as a polygonal column, and the shaft hole 201 is accordingly configured as a polygonal hole, thereby preventing the connection sleeve 20 from rotating related to the rotation drive end 413, thereby realizing that the rotation drive end 413 drives the connection sleeve 20 together with the rotation frame 2 to rotate. In some embodiments, a top of the water storage box 1 is provided with a hollow shaft 5. the connection sleeve 20 is rotatably sleeved to an outer side wall of the hollow shaft 5, thereby improving the reliability and stability of rotation of the rotation frame 2 relative to the water storage box 1. In the embodiment, the shaft portion 108 is configured as the hollow shaft 5. Of course, in some embodiments, the hollow shaft 5 and the shaft portion 108 can be arranged independently of each other.

In the embodiment, a central axis of the inlet pipe 414 coincides with a rotation axis P of the rotation frame 2, thereby improving the compactness and rationality of the overall structure. Specifically, the inlet pipe 414 is passed through the rotation drive end 413, the inner cavity of the connection sleeve 20, and the shaft portion 108 of the water storage box 1. Of course, in some embodiments, the central axis of the inlet pipe 414 and the rotation axis P of the rotation frame 2 may also be spaced apart.

As illustrated in FIG. 1 to FIG. 3 and FIG. 9, in some embodiments, the water storage box 1 further includes a breathable partition 103. The breathable partition 103 is arranged between the box lid 102 and the rotation frame 2. A buffer space 1031 is formed between the breathable partition 103 and the box lid 102. The buffer space 1031 is in air communication with the water storage compartment 104 by the through opening 107. The breathable partition 103 is provided with a plurality of the breathable holes 110. The plurality of the breathable holes 110 are in air communication with the buffer space 1031 and the incubation compartment 7. Thus, the buffer space 1031 may buffer the humidity so as to achieve an even dispersion of the humidity in the incubation compartment 7, thereby avoiding over-humidification or over-drying of the air in the localized incubation compartment 7, and thereby improving the hatching effect of the egg incubator 100. A size of the breathable hole 110 is smaller than a size of the through opening 107. Thus, the breathable partition 103 can be configured to isolate broken shells of the incubated egg or impurities from entering into the water storage box 1 through the breathable hole 110, thereby reducing a risk of contamination of the humidification fluid.

In some embodiments, a side wall of the bottom box 101 is provided with a water filling opening 105. The water filling opening 105 is in liquid communication with the water storage compartment 104. The water storage box 1 further includes a water filler cap 106. The water filler cap 106 is configured to open or close the water filling opening 105. Thus, on the one hand, the user can refill the water storage box 1 with humidification liquid during a process of incubation of eggs in the egg incubator 100, thereby improving the flexibility of the use of and the experience of using the egg incubator 100, and on the other hand, it is possible to realize the operation of replenishing the humidification liquid to the water storage box 1 without disassembling the water storage box 1, and it is easy to operate.

The water filler cap 106 is configured as, but is not limited to, a pull-out cap, a pivoting cap, or a sliding cap, etc. Thus, it is easy to operate the water filler cap 106 to open or close the water filling opening 105. Exemplarily, in the embodiment, the water filler cap 106 is configured as the pull-out cap. Of course, in some embodiments, the water filler cap 106 may also be fixedly coupled to the bottom box 101. For example, the water filler cap 106 is fixedly coupled to the bottom box 101 by a locking structure. The connection between the water filler cap 106 and the bottom box 101 may be arranged according to the actual situation, and the implementation of the present disclosure is not specifically limited.

In the embodiment, the humidity sensor 417 is provided on the housing 401 and is electrically connected to the main control circuit board 403. The humidity sensor 417 is configured to detect the air humidity of the incubator compartment 7. The main control circuit board 403 is configured to control the egg incubator 100 to enter into the humidifying work when the humidity sensor 417 detects that the air humidity of incubator compartment 7 is less than the first preset humidity threshold. The main control circuit board 403 is configured to control the egg incubator 100 to enter the dehumidifying work when the humidity sensor 417 detects that the air humidity of incubator compartment 7 is greater than the second preset humidity threshold. Thus, the egg incubator 100 is capable of accurately detecting the air humidity of the incubation compartment 7 and adjust the air humidity of the incubation compartment 7, thereby improving the hatching effect of the incubated egg by the egg incubator 100, realizing the automated control of the air humidity of the incubation compartment 7 by the egg incubator 100, and thereby saving the cost of manpower.

Exemplarily, in the embodiment, an outer side wall of the housing 401 is provided with an accommodation compartment 4019. The accommodation compartment 4019 is in air communication with the work compartment 408 and the incubation compartment 7. The humidity sensor 417 passes through the work compartment 408 and is accommodated within the accommodation compartment 4019, thereby facilitating installation and shortening a length of a connecting line of the humidity sensor 417 and the main control circuit board 403, and thereby improving the detection effect of the humidity sensor 417. Of course, in some embodiments, the humidity sensor 417 may also be provided within the work compartment 408. The accommodation compartment 4019 is arranged convexly relative to the work compartment 408. In other words, the accommodation compartment 4019 protrudes from the outer side wall of the housing 401. The arranging position of the humidity sensor 417 may be set according to the actual situation, and the implementation of the present disclosure is not specifically limited.

As illustrated in FIG. 1 to FIG. 6, in some embodiments, the rotation frame 2 further includes a heating structure 43. The heating structure 43 is configured to adjust the air temperature of the incubation compartment 7. The heating structure 43 and the fan 415 can be used in conjunction to increase the uniformity of the temperature of the air within the incubation compartment 7. The heating structure 43 may also be used to accelerate the evaporation of the humidification solution within the humidification tank 4011 to improve the efficiency of regulating the air humidity.

In some embodiments, the egg incubator 100 further includes a display 404. The display 404 is mounted to the top cover 406 and is electrically connected to the main control circuit board 403. The display 404 may be configured as a touch display or a non-touch display, thus the display 404 can provide a visual screen to a user.

In some embodiments, the egg incubator 100 further includes a function key 405. The function key 405 is mounted to the top cover 406 and is electrically connected to the main control circuit board 403.

The function key 405 include, but are not limited to, a switch key, a parameter setting key, and the like. For example, when the user operates the switch key, the egg incubator 100 may automatically activate the humidity sensor 417 to work to monitor the air temperature of the incubation compartment 7. When the humidity sensor 417 detects that the air humidity of the incubation compartment 7 is less than the first preset humidity threshold, the egg incubator 100 perform the humidifying work, and when the humidity sensor 417 detects that the air humidity of the incubation compartment 7 is greater than the second preset humidity threshold, the egg incubator 100 perform the dehumidifying work. For example, when the user operates the parameter setting button, the user is able to set a preset humidity parameter or a preset temperature parameter, etc. of the egg incubator 100.

In some embodiments, the egg incubator 100 further includes an indicator light 407. The indicator light 407 is mounted on the top cover 406 and is electrically connected to the main control circuit board 403. The indicator light 407 may be used to indicate a working state of the egg incubator 100, which facilitates prompting the user to intervene in the egg incubator 100 in a timely manner. In some other embodiments, the egg incubator 100 may also include a connection interface. The connection interface may include, but is not limited to, a power supply interface, a communication interface, a function expansion structure, and the like.

In some embodiments, the top cover 406 is further provided with a carrying handle structure 4062. The carrying handle structure 4062 is rotatably mounted to the top cover 406, thereby facilitating easy lifting of the egg incubator 100 by a user for ease of operation. Of course, the carrying handle structure 4062 may also be fixedly arranged on the top cover 406.

The egg incubator 100 according to the implementation of the present disclosure works as follows. The main control circuit board 403 receives the current desired target air humidity of the egg incubator 100. The current desired target air humidity of the egg incubator 100 can be user-defined or factory default setting of the egg incubator 100. When the humidity sensor 417 detects that the air humidity within the incubation compartment 7 is less than the first preset humidity threshold (i.e., the current target air humidity), the main control board 403 controls the door motor 423 to drive the electric exhaust door 422 to close the valve opening 4061 and controls the infusion member 411 to pump the humidification liquid from the water storage box 1 into the humidification tank 4011. The absorbent 416 adsorbs the humidification fluid stored within the humidification tank 4011. The main control circuit board 403 controls the fan 415 to rotate. Such that the humidification liquid adsorbed by the absorbent 416 may be evaporated, and the humidified air to be conveyed into the incubation compartment 7 through the internal circulation air path 425, thereby realizing humidification of the air in the incubation compartment 7. The infusion member 411 adopts the peristaltic pump.

When the humidity sensor 417 detects that the air humidity of the incubation compartment 7 is greater than the second predetermined humidity (i.e., the current preset air humidity), the main control board 403 controls the door motor 423 to drive the electric exhaust door 422 to open the valve opening 4061 and controls the infusion member 411 to stop pumping the humidification liquid from the water storage box 1 into the humidification tank 4011. The main control circuit board 403 also controls the fan 415 to rotate, and the air inside the incubation compartment 7 is discharged to the outside air via the external circulation air path 421, thereby realizing dehumidification of the air inside the incubation compartment 7. Further, when the humidity sensor 417 detects that the air humidity of the incubation compartment 7 is equal to the current target air humidity, the main control circuit board 403 controls the door motor 423 to drive the electric exhaust door 422 to close the valve opening 4061 and the fan 415 is controlled to stop working. Thus, the egg incubator 100 provided by the implementation of the present disclosure is capable of precisely regulating the air humidity inside the incubation compartment 7, thereby improving the hatching quality of the egg incubator 100.

The above is only implementations of the present disclosure, not to limit the scope of the patent of the present disclosure. Any equivalent structure or equivalent process transformation utilizing the contents of the specification and the accompanying drawings of the present disclosure, or directly or indirectly applying in other related technical fields, are similarly included in the scope of patent protection of the present disclosure.

What is claimed is:

1. An egg incubator with a precision adjustment function of humidity, comprising:
   a hood, provided with an incubation compartment and a mounting opening in air communication with the incubation compartment;
   a rotation frame, arranged in the incubation compartment and configured to carry an incubated egg;
   a host portion, arranged at the mounting opening, wherein the host portion comprises a housing, a fan, an exhaust valve, a humidity sensor, and a main control circuit board, the main control circuit board is electrically connected to the fan, the exhaust valve, and the humidity sensor, the housing is provided with a work compartment, a circulation air inlet, a circulation air outlet, and a valve opening, the circulation air inlet and the circulation air outlet are in air communication with the work compartment and the incubation compartment, the valve opening is in air communication with the work compartment and outside air, the fan is arranged in the work compartment, the exhaust valve is arranged at the housing and is configured to open or close the valve opening, the housing is provided with a humidification tank in a path of airflow providing by the fan, and the humidity sensor is configured to detect air humidity in the incubation compartment;

wherein the incubation compartment, the circulation air inlet, the work compartment, and the circulation air outlet are sequentially in air communication to form an internal circulation air path, and the incubation compartment, the circulation air inlet, the work compartment, and the valve opening are sequentially in air communication to form an external circulation air path;

wherein when the air humidity in the incubation compartment detected by the humidity sensor is less than a first preset humidity threshold, the main control circuit board controls the exhaust valve to close the valve opening, and the airflow providing by the fan is in contact with humidification liquid stored in the humidification tank and circulates between the work compartment and the incubation compartment by the internal circulation air path; and wherein when the air humidity in the incubation compartment detected by the humidity sensor is greater than a second preset humidity threshold, the main control circuit board controls the exhaust valve to open the valve opening, and the airflow providing by the fan is discharged to the outside air by the external circulation air path.

2. The egg incubator of claim 1, wherein the host portion further comprises an absorbent, the absorbent is arranged in the humidification tank.

3. The egg incubator of claim 2, wherein a bottom wall of the humidification tank is provided with a support strip, and the support strip is configured to support the absorbent.

4. The egg incubator of claim 1, wherein the humidification tank is arranged at a location of the housing proximal to the circulation air inlet.

5. The egg incubator of claim 1, wherein the humidification tank is arranged around a rotation axis of the rotation frame in at least one circle.

6. The egg incubator of claim 1, wherein the exhaust valve comprises a door motor and an electric exhaust door, the electric exhaust door is removably arranged on the housing, the door motor is in transmission connection with the electric exhaust door, and the door motor is configured drive the electric exhaust door to open or close the valve opening.

7. The egg incubator of claim 6, wherein the exhaust valve further comprises a transmission gear, the door motor is in transmission connection with the transmission gear, and the electric exhaust door is provided with a tooth rack engaged with the transmission gear.

8. The egg incubator of claim 6, wherein the egg incubator further comprises a top cover, the top cover is coupled to the end cover to form a circuit compartment and an exhaust compartment, the circuit compartment is located above the work compartment and is arranged in isolation from the exhaust compartment, the main control circuit board is arranged in the circuit compartment, the top cover is provided with an exhaust hole, and the exhaust hole is in air communication with the exhaust compartment and the outside air.

9. The egg incubator of claim 1, wherein the housing comprises a housing body and an end cover, the housing body is coupled to the end cover to form the work compartment, the end cover is provided with the valve opening, the housing body is provided with a guiding air duct, the guiding air duct is in air communication with the valve opening and the work compartment, an inlet end of the guiding air duct faces towards the fan, and an outlet end of the guide air duct faces towards the valve opening.

10. The egg incubator of claim 9, wherein an inner side wall of the housing body is provided with a support boss, the housing further comprises a motor support partition, the motor support partition is arranged in the work compartment and carried on the support boss, the motor support partition is configured to separate the work compartment to form a first compartment and a second compartment, the motor support partition is provided with a ventilation outlet, the ventilation outlet is in air communication with the first compartment and the second compartment, the housing body is provided with the circulation air inlet in an area corresponding to the first compartment, and the housing body is provided with the circulation air outlet in an area corresponding to the second compartment.

11. The egg incubator of claim 10, wherein the egg incubator further comprises a water storage box, the host portion further comprises an infusion member, the infusion member is provided in the work compartment and configured to deliver the humidification liquid from the water storage box to the humidification tank.

12. The egg incubator of claim 11, wherein the infusion member is configured as a peristaltic pump.

13. The egg incubator of claim 11, wherein the water storage box comprises a bottom box and a box lid, the bottom box is provided with a water storage compartment, the box lid is arranged on a top of the bottom box, the host portion further comprises an inlet pipe, one end of the inlet pipe is in liquid communication with the water storage compartment, and an another end of the inlet pipe is threaded through the housing and in liquid communication with the infusion member.

14. The egg incubator of claim 13, wherein the box lid is provided with a through opening, the through opening is in air communication with the water storage compartment and the incubation compartment, and the water storage box further comprises a movable cover plate, and the movable cover plate is coupled to the box lid and configured to open or close the through opening.

15. The egg incubator of claim 14, wherein the water storage box further comprises a breathable partition, the breathable partition is arranged between the box lid and the rotation frame, a buffer space is formed between the breathable partition and the box lid, the buffer space is in air communication with the water storage compartment by the through opening, the breathable partition is provided with a plurality of the breathable holes, and the plurality of the breathable holes are in air communication with the buffer space and the incubation compartment.

16. The egg incubator of claim 13, wherein a side wall of the bottom box is provided with a water filling opening, the water filling opening is in liquid communication with the water storage compartment, the water storage box further comprises a water filler cap, and the water filler cap is configured to open or close the water filling opening.

17. The egg incubator of claim 11, wherein the infusion member is mounted on the motor support partition and located in the second compartment.

18. The egg incubator of claim 11, wherein the motor support partition comprises a base and a carrier plate, the base is provided with the ventilation outlet and an accommodation groove, the accommodation groove is in air communication with the second compartment and the ventilation outlet, the infusion member is accommodated in the accommodation groove, the carrier plate is coupled to the base at an edge of the accommodation groove and carried on the support boss, and the fan is located above the carrier plate and faces towards the accommodation groove.

19. The egg incubator of claim 11, wherein the host portion further comprises an absorbent, the absorbent is arranged in the humidification tank and located in the first compartment, and an orthographic projection of the ventilation outlet in a height direction of the egg incubator is located within an orthographic projection of the absorbent in the height direction of the egg incubator.

20. The egg incubator of claim 19, wherein the absorbent abuts against a bottom wall of the motor support partition in the height direction of the egg incubator.

\* \* \* \* \*